Aug. 9, 1949.　　　　　R. PUDELKO　　　　　2,478,637
MAXIMUM POWER DEMAND INDICATOR
Filed Sept. 21, 1946　　　　　　　　　　　　2 Sheets-Sheet 1

INVENTOR
RICHARD PUDELKO
BY
Morgan, Finnegan & Durham
ATTORNEYS

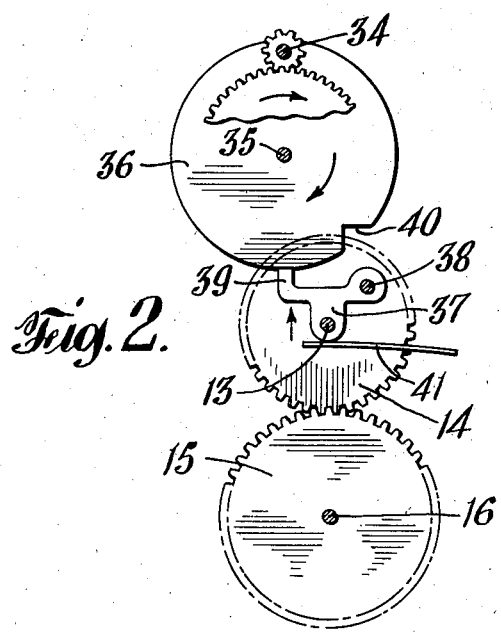
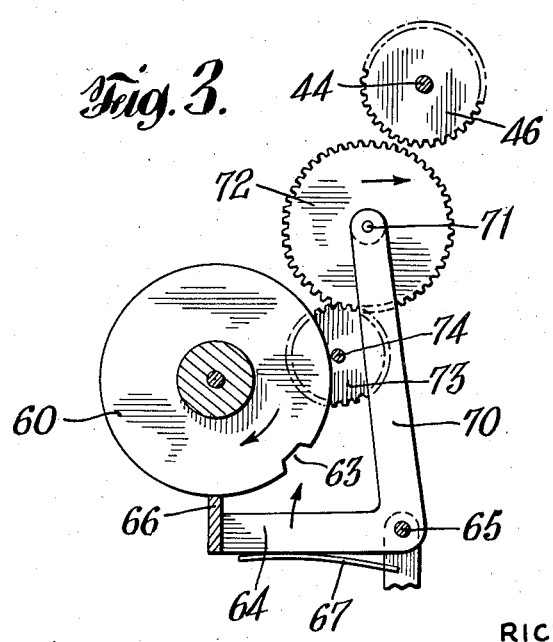

Patented Aug. 9, 1949

2,478,637

UNITED STATES PATENT OFFICE 2,478,637

MAXIMUM POWER DEMAND INDICATOR

Richard Pudelko, Zug, Switzerland, assignor to Landis & Gyr, A. G., a body corporate of Switzerland Application September 21, 1946, Serial No. 698,562
In Switzerland December 24, 1943

3 Claims. (Cl. 171—34)

The present invention relates to a maximum-demand indicator with periodic self-acting reset and addition of the heaviest load average values attained during a reading period.

This application is a continuation-in-part of my co-pending application Serial No. 528,993, filed March 31, 1944, now abandoned.

The well known maximum-demand measuring instruments which are employed for determining the maximum consumption, especially of electric plants, comprise in the most commonly used fundamental make a pusher (driven by the counting system) for a sweep hand (maximum pointer) with or without inking or printing work. This pointer on the respective inking or printing work, if any, is, in regular tme intervals (recording or clock periods) of, say 15 minutes, uncoupled for a short length of time from the counter by a timing device, brought back to its starting position, and re-coupled.

With the ordinary maximum-demand measuring instruments the maximum average value of consumption for each recording period which occurred within a reading or computation period, e. g., a month, can be read off on the maximum attachment. These maximum meters are indicating instruments which must be inspected on the site by a meterman of the operating works after expiration of each reading or computation period in order to take the reading of the maximum indication, to jot it down and to reset the maximum pointer to zero by hand.

On the other hand, devices have also been developed in which, in combination with a time-controlled device for bringing the maximum pointer—after the lapse of a reading period—automatically back to zero from the peak position attained within this period, an inking device is provided which records the reset motion of the maximum pointer. Further, there exist already similar instruments with printing work which immediately prior to the trip of the reset motion of the maximum pointer prints the value of the respective maximum position onto an underlayer. All of these known devices give a corresponding number of indications for a greater number of reading periods. On the other hand, however, for tariff reasons, it may occasionally be desirable that for each reading period the determined peak load average values be continuously integrated and totally indicated. There have also been known maximum-demand measuring instruments in which such an addition of the heaviest load average values is obtained by resetting the maximum pointer by hand at the end of each reading period and transmission of this reset action onto a counter. To such devices, however, a serious objection is raised in that they are dependent on attendance.

It is an object of the present invention to obviate this drawback by providing, in combination with a time-controlled device adapted automatically to restore to zero a maximum indicator—after the lapse of a reading period—from its peak position attained within this period, a counting mechanism which continuously registers the values of the recurred maximum positions.

Of the drawings:

Fig. 2 is a detail view of certain of the movable gearing mechanism shown in Fig. 1, viewed as indicated by the line 2—2 in Fig. 1; and Fig. 3 is a detail view of certain other movable gearing mechanism shown in Fig. 1, viewed as indicated by the line 3—3 in Fig. 1.

Figure 1:
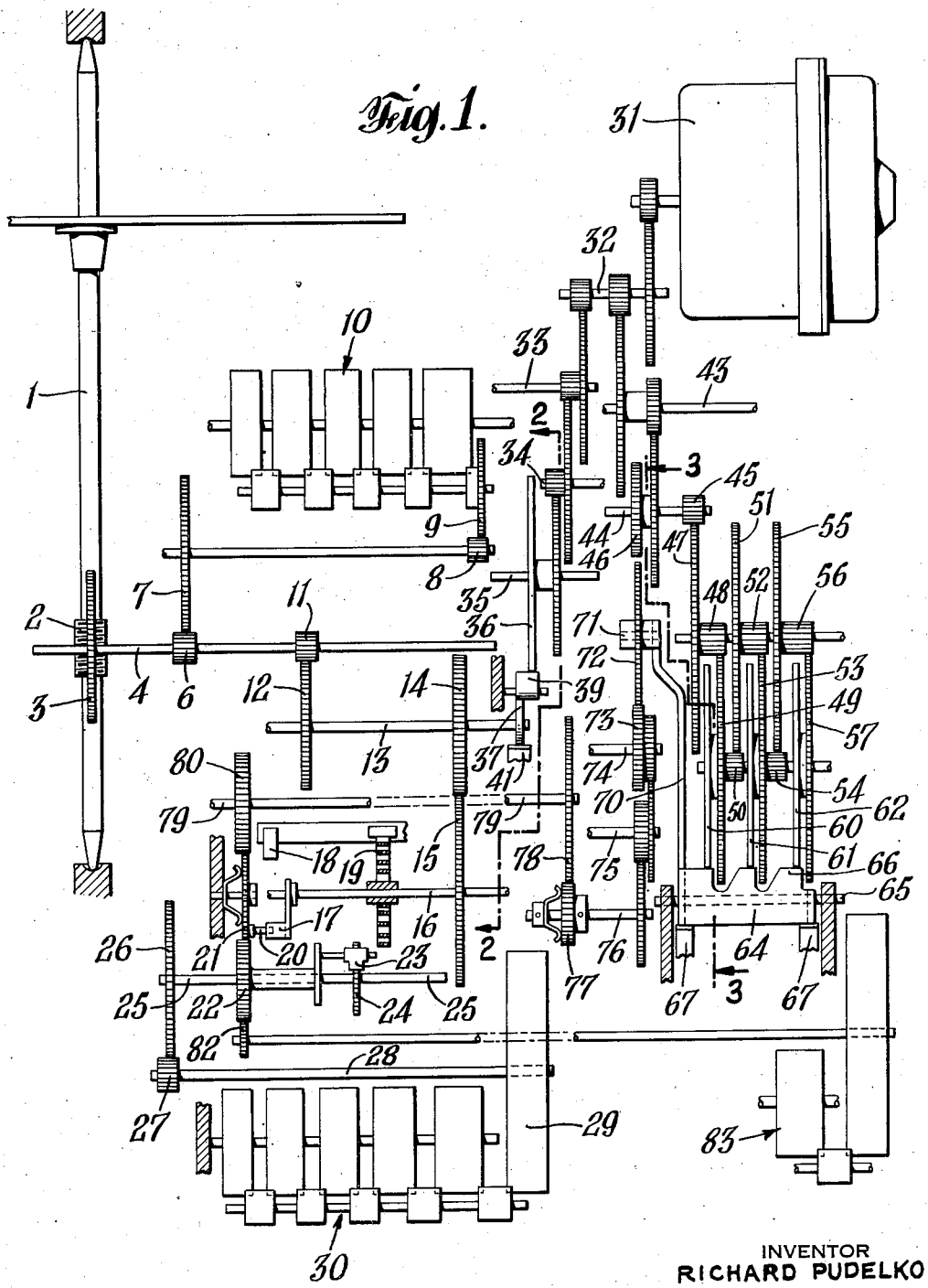
Fig. 1 is a schematic showing of an illustrative embodiment of the present invention.

Referring now to the drawing, the rotatable shaft 1 of a meter may carry a worm 2 driving worm gear 3. Worm gear 3 may drive a shaft 4 upon which gear 6 is mounted of gear combination 6 and 7. This gear combination may have any desired gear ratio which may be adjusted to suit the required conditions. Gear 7 may drive meshing gear wheels 8 and 9 of a power indicating counter 10. Worm gear 3 also drives gear 11 of gear combination 11—12 also having a desired gear ratio which may be predetermined to suit the occasion. Gear 12 turns a shaft 13 upon which gear 14 is mounted. Meshing with gear 14 is gear 15 mounted on a shaft 16 carrying dog 17. Dog 17 normally rests against stop 18 by virtue of spiral spring 19. However, during meter operation and assuming engagement of gears 14 and 15, dog 17 will be moved away from stop 18 and is adapted to push pin 20 carried by maximum demand gear 21.

Maximum demand gear 21 meshes with gear 22 which gear carries pawl 23 so as to move with gear 22. Pawl 23 is adapted to cooperate with ratchet 24 mounted upon shaft 25. Shaft 25 carries gear 26 which meshes with gear 27 making a gear combination 26—27 having any desired ratio. Gear 27 is mounted on a shaft 28 carrying calibrated demand dial 29 which dial may be coupled to a maximum demand register 30.

To time the various means within the meter system, synchronous motor 31 may be provided. Synchronous motor 31 may drive shaft 32 carrying a plurality of gears. One gear may mesh with gears on shaft 33 which meshes with gears on shaft 34 which, in turn, meshes with a gear on shaft 35. Shaft 35 drives demand interval control disc 36 which cooperates with pawl 37. As best shown in Fig. 2 of the drawings, pawl 37 serves as a journal for shaft 13 carrying gears 12 and 14, and the pawl is mounted for pivotal movement about an axis 38. The finger 39 of pawl 37 is adapted to ride on the outer periphery of control disc 36, being spring pressed against it by a leaf spring 41 bearing against the pawl. A notch, designated by the numeral 40 in Fig. 2, is provided in disc 36, and upon each complete revolution of the disc, the finger 39 falls once into the notch 40, and pawl 37 pivots slightly about axis 38 carrying with it an end of shaft 13. This action marks the end of a demand interval, and gear 14 is lifted momentarily out of mesh with gear 15. During this disengagement of gears 14 and 15, spiral spring 19 will turn dog 17 back against stop 18. This demand interval may be any desired time such as fifteen minutes, for instance, so that every fifteen minutes dog 17 goes back against stop 18. It is understood that pin 20 of gear 21 is unaffected by the return movement of dog 17 and is only pushed ahead by an amount corresponding to the maximum power during a demand interval.

Shaft 32 also controls the meter system to reset maximum demand gear 21 at the end of a reading or billing period. To accomplish this, shaft 32 drives gears on shaft 43 which, in turn, drives gears on shaft 44, including a gear 46. Shaft 44 drives pinion 45 engaging large gear 47. Gear 47 carries pinion 48 locked thereto which meshes with large gear 49. Large gear 49 drives pinion 50, which, in turn, drives large gear 51. Gear 51 carries pinion 52 and through gear 53, pinion 54, gear 55, and pinion 56 drives gear 57. The gear ratio between three disc gears 49, 53 and 57 is preferably large and may be of the order of one to one hundred between adjacent gears. Thus, gear 57 may have its speed reduced down so that it makes a complete revolution once every thirty days. Gear 49 will turn ten thousand times as fast.

As best shown in Fig. 3 of the drawings, each cam disc is provided with a notch 63 in its periphery. Cooperating with cam discs 60, 61 and 62 is a pawl 64, pivotally mounted by a shaft 65. Fingers 66 of pawl 64 are adapted to ride on the peripheries of cam discs 60, 61 and 62, being spring pressed toward the discs by a leaf spring 67 engaging the pawl. The alignment of notches 63 in cam discs 60, 61 and 62 marks the end of a reading or billing period, and at that time fingers 66 fall into the respective notches and pawl 64 is pivoted about shaft 65. Thus pawl 64 and the three discs function as a coincidence means which will operate once a month. Pawl 64 has an integral arm 70 at the free end of which is mounted stub shaft 71. Stub shaft 71 carries a gear 72 which, as shown in Fig. 3, is always in mesh with a gear 73 on a shaft 74 and which is adapted to mesh with gear 46 on shaft 44 when pawl 64 is tripped and arm 70 supporting shaft 71 is pivoted about its shaft 65. In Fig. 1 of the drawings gears 46 and 72 are shown slightly spaced for greater clarity, but it is to be understood that the true relationship of the gears is that shown in Fig. 3, which is such that gear 72 meshes with gear 46 upon pivotal movement of arm 70. The gear 72 on shaft 71 drives gears, including gear 73 on shaft 74, gears on shaft 75, and finally a gear on shaft 76. Shaft 76 carries a pinion 77 which engages a gear 78 on shaft 79, and this shaft has a gear 80 engaging maximum demand gear 21.

It is clear that once a month when one billing period ends, pawl 64 will be tripped momentarily. When pawl 64 is tripped, synchronous motor 31 will drive, through the various gears on shafts 32, 43, 44, 71, 74, 75, 76 and 79, maximum demand gear 21. The direction of this drive is such that gear 21 is turned back so that pin 20 bears against dog 17 which, in turn, bears against stop 18. The end of a billing period coincides with the end of a demand period, so that gears 14 and 15 are out of mesh during this action.

At the beginning of a billing period, gear 21 and dog 17 both start from their initial starting positions at stop 18. Dog 17 moves forward during each demand period to push pin 20 ahead. The position of pin 20 will be determined by the maximum movement of dog 17 during a billing period. This position of dog 17 will be determined by the amount of power metered during a demand period. At the end of each demand period, gears 14 and 15 are momentarily disengaged so that dog 17 starts from the beginning at stop 18 at the beginning of each demand interval.

With movement of gear 21 in response to maximum demand movement of dog 17, gear 22 is also moved. The direction of movement of gear 22 is such that pawl 23 moves backward or slides along the teeth of ratchet 24. The amount of movement naturally depends upon the maximum demand during any demand interval. Hence, the backward movement of pawl 23 may also be considered an indication of maximum demand during a billing period. The driving of gear 21 by dog 17 also involves driving the gears on shafts 79, 76, 75, 74 and 71, but gears 46 and 72 are disengaged at this time, so there is no conflicting drive with synchronous motor 31.

At the end of the billing period, synchronous motor 31 turns gear 21 back against stop 18. When gear 21 is moved back toward stop 18, gear 22 is also moved. During this resetting movement of gear 22, pawl 23 engages ratchet 24 to urge the same through an angle depending upon the resetting movement of demand gear 21. This movement of ratchet 24 naturally causes movement of drum 29 and demand register 30.

It is understood that means for showing the momentary maximum position may be provided. Thus, gear 22 may drive pinion 82 which may operate means 83 for showing momentary maximum position.

It is also possible to use a clock instead of synchronous motor 31, or, if more precise action is desired, a calendar clock may be used for taking account of the exact number of days in each month. It is understood, of course, that the billing or reading period may be a week, a day, or any other period desired.

The invention in its broader aspects is not limited to the specific mechanisms shown and described but departures may be made therefrom within the scope of the accompanying claims without departing from the principles of the invention and without sacrificing its chief advantages.

What I claim is:

1. A demand meter having means for indicating the maximum power within a demand interval over a billing period; said meter being of the type wherein a member is moved during a demand interval and periodically returned to its starting position, said meter including a power meter for indicating power consumed, a demand register, means for indicating the maximum power demand interval within a billing period, and time controlled means for resetting said maximum power demand indicating means at the end of a billing period and actuating said demand register, said time controlled means comprising a synchronous motor, a plurality of rotatable discs each including a control means, a reduction gear train drivably coupling said discs providing a high step-down speed ratio therebetween whereby said control means coincide once during said billing period, means coactable with said discs for detecting the coincidence of said control means, and means carried by said last named means temporarily coupling said demand resetting and register actuating means to said motor upon coincidence of said control means whereby said time control means is periodically operable to accurately control the change over between successive billing periods.

2. The structure of claim 1 wherein said discs have notches in their peripheries to function as the control means.

3. A demand meter having means for indicating the maximum power within a demand interval over a billing period, said meter including a power meter for indicating power consumed, a demand gear, means including a dog connecting said power meter and demand gear, said demand gear having an initial predetermined starting position at the beginning of a billing period, said dog having an initial starting position at the beginning of a demand interval, a synchronous motor, intermittent means controlled by said synchronous motor for disengaging said dog and power meter at the end of each demand interval for a short time, means for returning said dog to its initial starting position during said disengagement, said dog travelling over a range determined by the power meter during said demand interval and moving said demand gear an amount corresponding to the maximum power during a demand interval within a billing period, a demand register, pawl and ratchet means connecting said register and said demand gear, said pawl and ratchet being adapted to slip during said movement of said demand gear from its initial starting position but to engage during movement of said demand gear back to its initial starting position, a plurality of rotatable discs each having a notch in its periphery, a reduction gear train drivably coupling said discs to provide a high step-down speed ratio therebetween whereby said notches coincide once during a billing period, means coupling said gear train to said motor, means coactable with said discs for detecting the coincidence of said notches, and means operable by said coactable means upon coincidence of said notches temporarily coupling said pawl and ratchet means to said motor whereby said demand gear is automatically reset to initial starting position for operation through a subsequent billing period.

RICHARD PUDELKO.

REFERENCES CITED

The following references are of record in the file of this patent:

UNITED STATES PATENTS

| Number | Name | Date |
|---|---|---|
| 972,538 | Karapetoff | Oct. 11, 1910 |
| 1,619,473 | Holtz | Mar. 1, 1927 |
| 1,654,730 | Holtz | Jan. 3, 1928 |
| 1,664,243 | Chubb | Mar. 27, 1928 |
| 2,123,977 | Wagner | July 19, 1938 |